United States Patent [19]

Minford et al.

[11] Patent Number: 4,780,432
[45] Date of Patent: Oct. 25, 1988

[54] CONTROLLED FIBER DISTRIBUTION TECHNIQUE FOR GLASS MATRIX COMPOSITES

[75] Inventors: Eric Minford, South Windsor; Karl M. Prewo, Vernon; David J. McFarlin, Ellington; Antonio B. Carulo, Vernon, all of Conn.

[73] Assignee: United Technologies Corporation, Hartford, Conn.

[21] Appl. No.: 902,985

[22] Filed: Sep. 2, 1986

[51] Int. Cl.$^4$ .................. C03C 1/00; C03C 14/00
[52] U.S. Cl. ............................. 501/32; 501/35; 501/95; 264/DIG. 19
[58] Field of Search .............. 264/297.2, DIG. 19, 264/108, 109, 122, 125, 328.1, 328.2, 328.17; 501/32, 35, 95, 81; 65/18.1, 18.4, 3.2, 33; 428/367, 697, 114, 902

[56] References Cited

U.S. PATENT DOCUMENTS

| | | | |
|---|---|---|---|
| 3,328,501 | 6/1967 | Barnett | 264/108 |
| 3,718,720 | 2/1973 | Lambdin et al. | 264/29 |
| 3,946,097 | 3/1976 | Takahashi et al. | 264/174 X |
| 4,093,693 | 6/1978 | Lemelson | 264/171 |
| 4,314,852 | 2/1982 | Brennan et al. | 501/58 |
| 4,324,843 | 4/1982 | Brennan et al. | 428/697 |
| 4,414,011 | 11/1983 | Layden et al. | 65/18.1 |
| 4,428,763 | 1/1984 | Layden | 65/4.21 |
| 4,464,192 | 8/1984 | Layden et al. | 65/18.1 |
| 4,511,663 | 4/1985 | Taylor | 501/4 |
| 4,521,451 | 6/1985 | Eldridge et al. | 427/130 |
| 4,524,091 | 6/1985 | Blaauw et al. | 427/74 |
| 4,624,886 | 11/1986 | Cogswell et al. | 428/245 |
| 4,626,461 | 12/1986 | Prewo et al. | 428/113 |
| 4,626,515 | 12/1986 | Chyung et al. | 501/32 |
| 4,650,626 | 3/1987 | Kurokawa | 264/278 |
| 4,670,203 | 6/1987 | Chang | 264/40.6 |
| 4,692,291 | 9/1987 | Angell, Jr. | 264/109 |

Primary Examiner—William R. Dixon, Jr.
Assistant Examiner—Andrew B. Griffis
Attorney, Agent, or Firm—A. Dean Olson

[57] ABSTRACT

A method for manufacturing a discontinuous fiber reinforced glass matrix composites by injection molding using an injection nozzle that separates substantially all of a multifilament yarn into individual fibers resulting in a composite having greater crack resistance. The method comprises impregnating continuous filament yarn with glass matrix powders comprising glass, glass-ceramic powders or a mixture thereof. The impregnated multifilament yarn is chopped into discontinuous lengths and exposed to a temperature sufficient so that the matrix material softens. Pressure is applied to the heated impregnated multifilament yarn sufficient to displace the yarn into a mold through an injection nozzle contoured such that sufficient die-wall shear forces are generated to separate substantially all of the multifilament yarn into individual filaments. A mold pressure is maintained sufficient to prevent relaxation of the composite until the strain point of the glass is reached.

5 Claims, 3 Drawing Sheets 3.6X 3.6X

5X

5X

CONTROLLED FIBER DISTRIBUTION TECHNIQUE FOR GLASS MATRIX COMPOSITES

DESCRIPTION

1. Technical Field

The field of art to which this invention pertains is molding processes, and particularly molding processes for fiber reinforced composite articles.

2. Background Art

Because of the scarcity and increasing expense of many conventional high temperature structural metals, increased attention has focused on non-metal fiber reinforced composites as replacements for conventional high temperature metal alloys. Use of metal replacement, high strength fiber reinforced resin and even high strength fiber reinforced metal matrix composites has progressed to the point of commercial acceptance in products ranging from sporting goods to advanced jet aircraft components. One of the big problems with these composites, however, has been their maximum use temperature.

Ceramic, glass and glass-ceramic bodies are known to the art which can be employed in high temperature applications. Unfortunately, however, these bodies frequently lack the mechanical strength desired and are invariably deficient in toughness and impact resistance. This situation has given rise to the preparation of composite bodies consisting of a matrix of ceramic, glass, or glass-ceramic material with inorganic fibers dispersed in continuous or discontinuous fashion therein. Henceforth referred to as glass matrix composites, these materials are described in U.S. Pat. Nos. 4,314,852 and 4,324,843. Glass-ceramic matrix-silicon carbide fiber composite components prepared according to the teachings of the above-referenced patents exhibit physical properties which permit their utilization in heat engines and other applications to effect significant improvement in performance. Such applications, however, require that novel methods of fabrication be found for the production of complex shaped parts with reinforcing fibers distributed, for example, in at least three directions to impart improved strength.

Even through great strides have been made in this area, difficulties exist in methods of preparing such improved composite articles. In the past, continuous fiber reinforcement for composite articles has been achieved through the use of collimated fiber tapes, felts and papers which are impregnated with glass-carrier slurries, cut to size, oriented and then stacked in a die for hot pressing. However, this procedure is inadequate for more complex shapes in that it achieves only a planar array of fibers. It is also difficult to form cylinders and other complex shapes with such materials.

Furthermore, in many resin, metal and even glass matrix composite applications careful prearrangement of fiber reinforcement is not required and a more random distribution of e.g. chopped fibers would provide adequate performance characteristics. This would also permit rapid, low cost fabrication of precisely shaped articles.

Commonly assigned U.S. Pat. No. 4,464,192, the disclosure of which is hereby incorporated by reference, discloses a method of making complex shaped (e.g. having curved surfaces or walls) fiber reinforced glass matrix composites by injection molding. However, there is a continual need for improved molding techniques.

Accordingly, there is a constant search in this art for rapid, relatively simple methods of forming glass matrix composites particularly adapted to forming such composites in complex shape.

3. Disclosure of Invention

This invention relates to a method for manufacturing discontinuous fiber reinforced glass matrix composites by injection molding using an injection nozzle that separates substantially all of the yarn into individual fibers resulting in a composite having greater crack resistance. The method comprises impregnating continuous filament yarn with glass matrix powders comprising glass, glass-ceramic powders or a mixture thereof. The impregnated multifilament yarn is chopped into discontinuous lengths and exposed to a temperature sufficient so that the matrix material softens. Pressure is applied to the heated impregnated multifilament yarn sufficient to displace the yarn into a mold through an injection nozzle contoured such that sufficient die-wall shear forces are generated to separate substantially all of the multifilament yarn into individual filaments. A mold pressure is maintained sufficient to prevent relaxation of the composite until the strain point of the glass is reached.

This invention makes a significant advance in the glass matrix fiber reinforced art by providing a process that separates fibers resulting in stronger composites.

The foregoing and other features and advantages of the present invention will become more apparent from the following description and accompanying drawings.

BEST MODE FOR CARRYING OUT THE INVENTION

Figure 1:
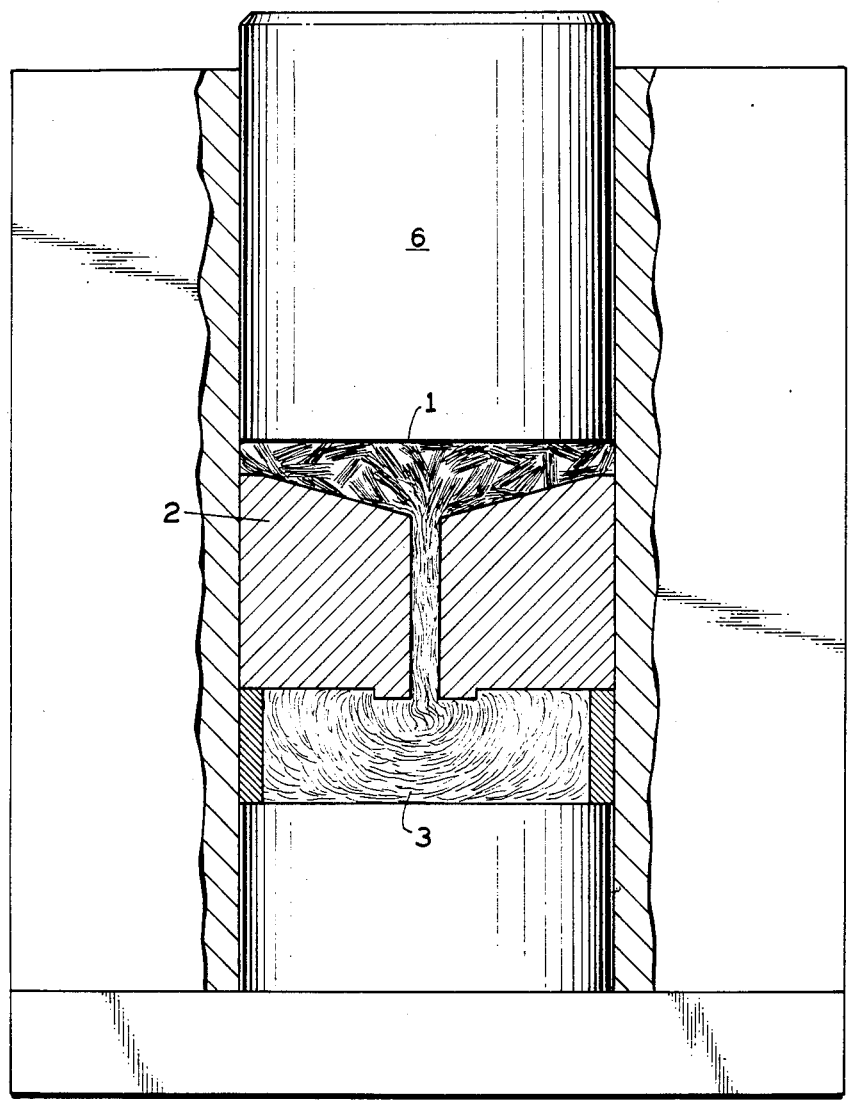
FIG. 1 shows a side view partly broken away and partly in section showing the final stages of filaments being forced through the nozzle portion of the molding apparatus of this invention.

While any glass which will impart high temperature strength properties to the composites can be used with the present invention, Corning 7740 or 7070 borosilicate glass (Corning Glass Works, Corning, N.Y.) was found well suited for this process. Similarly, Corning 1723 aluminosilicate glass is preferred. The borosilicate glass and the aluminosilicate glass can be used in its as-received −325 mesh size form. It should also be noted that mixtures of the above glasses may also be used as well as mixtures of the above glasses with high silica glasses (Corning 7913, 7930 and 7940 high silica glasses). It is especially preferred to use the borosilicate glasses because their viscosity temperature characteristics enhance their flowability.

Another attractive glass matrix material for the process of the present invention is a glass-ceramic. During composite densification, the matrix is retained in the glassy state, thus avoiding fiber damage and promoting densification under low applied pressure. After densification to the desired fiber plus matrix configuration, the glassy matrix can be converted to the crystalline state, the degree and extent of crystallization being controlled by the matrix composition and heat treatment schedule employed. A wide variety of glass-ceramics can be used in this manner; however, when using silicon carbide fibers, a strict limitation on the amount and activity of titanium present in the glass is of controlling importance. Accordingly, if silicon carbide fibers and titania nucleating agents are used, the titania must be inactivated or kept below 1% by weight. This can be accomplished by simply substituting another nucleating agent such as zirconia for the conventional titania or adding an agent to mask the reactivity of the titania toward the silicon carbide fiber. However, in any case, it is necessary to either eliminate or mask the effects of the titania on the silicon carbide fiber to attain a composite with good high temperature strength properties. And while conventional lithium aluminosilicate is the preferred glass-ceramic, other conventional glass-ceramics such as aluminosilicate, magnesium aluminosilicate, and combinations of the above can be used as long as the ceramic matrix material is titanium free (less than about 1% by weight) or masked. Note commonly assigned U.S. Pat. No. 4,324,843, the disclosure of which is incorporated by reference. It is especially preferred to use lithium aluminosilicate because of enhanced compatability with carbon and silicon carbide fibers.

In general, the starting glass-ceramic material can be obtained in the glassy state in powder form. If, however, the glass-ceramic material is obtained in crystalline form, it will be necessary to melt the material to form it into the glassy state, solidify it and subsequently crush it into powder form, preferably about −325 mesh, prior to making up the slurries according to the present invention. It is important in selecting a glass-ceramic material that one be selected which can be densified in the glassy state with the viscosity low enough to permit complete densification with subsequent transformation into a substantially complete crystalline state. It is also possible, however, to convert the starting crystalline powder to the glassy state during preheat treatment prior to application of pressure for densification.

While any high temperature stable fiber material can be used in the method according to the present invention, such as silicon carbide, alumina, or silicon nitride, carbon fibers are especially preferred. A multifilament carbon yarn with an average filament diameter up to 10 microns, for example about 7 to about 10 microns, is especially preferred. Hercules Incorporated of Wilmington, Del. produces such a yarn with 1000, 3000, 6000 or 12,000 fibers per tow and an average fiber diameter of 8 microns. The average strength of the fiber is approximately 2758 mega-Pascals (MPa). The yarn has a density of approximately 1.84 grams per cubic centimeter and an elastic modulus of approximately 379 giga-Pascals (GPa). It is especially preferred to use HMU TM carbon fiber available from Hercules Incorporated (Wilmington, Del.) because of its compatibility with matrix glasses. Fiber whiskers, such as F-9 silicon carbide whiskers marketed by Arco Chemicals (Greer, S.C.) or SNW-Silicon Nitride made by Tateho Chemical Industries Co. Ltd. of Japan may also be used.

Any polymeric binder which dissolves or disperses readily in the particular carrier material selected and provides lubricity to facilitate cold pressing can be used with the present invention. Latex acrylic-type polymers and in particular Rhoplex TM latex-acrylic (Rohm & Haas Corporation, Philadelphia, Pa.) have been found to be particularly suitable binder materials for the process of the present invention. Similarly, the Carbowax TM (Union Carbide Corporation) series of polymers and in particular, Carbowax 4000 is preferred. Alternatively, any inorganic binder which dissolves or disperses readily in the particular carrier material selected can be used with the present invention. Colloidal silica solutions and in particular, Ludox TM (E. I. DuPont de Nemours, Del.) ave been found to be particularly suitable binder materials for the process of the present invention. Accordingly, any carrier material compatible with such binders can also be used, with water being preferred.

While the amounts of materials may vary, the slurry is generally prepared so that the mixture of glass matrix powder, binder, and carrier liquid gives a stiff mixture when added to the fibers. Typically, the amount of glass added will be such as to give about 15% to about 50% by volume concentration of fibers when the carrier liquid and binder have been removed. Typically, for each gram of −325 mesh glass powder in the slurry, there will be about 1.80 milliliters of carrier liquid (preferably water), and about 0.2 milliliters of organic binder. The final molded article generally contains about 50% to about 85% by volume glass matrix and preferably about 70%.

The fiber tows are then drawn through the glass-binder-water slurry in such a way that the slurry saturates the fiber tow. When the typical proportions given above are employed, it will be found that the fiber tows will be impregnated with an amount of glass sufficient to bring the volume fraction of glass into the 50% to 85% range desired. The impregnated tows are then wound onto a mandrel and dried. The dried tows are then chopped to a length useful with the intended mold. The length selected depends on the smallest size mold wall thickness (e.g. cylinder wall thickness). The molding composition should be short enough to prevent clumping when passing through such a mold wall. Preferably, such fiber tows will be about 0.635 centimeter to about 2.54 cm in length and, for example, with a mold wall thickness of about 0.254 cm fiber tows less than 1.27 cm in length were used.

The molding composition is then heat treated to drive off the remaining water and binder and then loaded into the reservoir chamber of the molding apparatus shown in FIG. 1. According to FIG. 1, the glass mix is placed in the tool reservoir 1, the tool is heated to the temperature described below, pressure is applied via a plunger 6 forcing the heated mix through the injection nozzle 2 and into the cavity 3 (mold shape) below. Alternatively, the molding composition may be hot pressed to form suitable billets.

Alternatively, the molding composition may be hot pressed to form suitable billets for injection molding subsequent to burning off the carrier liquid and binder in a suitable atmosphere. And in some instances, depending upon the size and shape of the part to be made, a simple mechanical mixture of chopped fibers (or whiskers) and glassy powder such as achievable in a suitable blender may constitute a suitable molding compound which can be injection molded without further predensification. However, the very low density of such mixtures (typically about 10% of the density of the molded object) would require a very large molding apparatus with substantial debulking capability.

The molding composition, either in loose or preconsolidated form, is now ready for injection molding. The molding apparatus (including mold) is heated to a temperature sufficient so that the glass matrix softens preferably having a viscosity of about $10^3$ to about $10^5$ poise, where poise is the cgs unit of absolute viscosity and is equal to 0.1 Pascal second. Above about $10^5$ poise, the glass matrix is too viscous and clogging of the injection nozzle may happen. Below about $10^3$ poise, the glass matrix becomes too fluid and separation of the fibers and matrix may occur. For the conventional glasses and ceramics described above, this requires temperatures typically about 900 degrees centigrade (° C.) to about 1500° C. However, for the preferred carbon fiber-borosilicate glass mixture, the temperature is about 1000° C. to about 1250° C.

The "molten" glass matrix/fiber mixture is then displaced (i.e. transferred) into the mold having the desired shape through an injection nozzle. The injection nozzle is configured (i.e. contoured, shaped) so that sufficient die-wall (nozzle wall) shear forces are generated to separate substantially all (i.e. at least about 90%) of the chopped multifilament yarn into individual filaments. The die-wall shear force is generated by the frictional drag exerted by the walls of the injection nozzle on the molding composition as it is transferred through the nozzle. These frictional drag forces cause the fiber tows to shear apart into individual filaments without causing damage to the filaments. To best accomplish this shear separation, it is preferred that the injection nozzle comprises a tubular shape open at both ends, the inner surface of which is cylindrical in shape. While any shape cross-section of nozzle with appropriate dimensions will produce adequate results, the preferred cross-section shape is circular so as to best concentrate the die-wall shear force. In the case of a circular injection nozzle best results (in terms of degree separation) are obtained when the diameter of the nozzle is less than the cut length of the fiber tows because this forces alignment of the tows in the nozzle to best effect tow separation. As an example, for tow lengths that are about 1.25 cm to about 1.50 cm in length nozzle diameters that are about 0.75 cm to about 1.00 cm result in the separation of substantially all the filaments and, therefore, a uniform mixture. Likewise, the length of the nozzle should be greater than or equal to the bundle length to allow for alignment of the tows. For the tow lengths and the nozzle diameters given above the nozzle length should be about 1.50 cm or greater, although too long an injection nozzle length would serve to unnecessarily increase the size of the molding apparatus. The pressure applied to the plunger of the molding apparatus should be sufficient to cause complete consolidation of the molding composition in the reservoir. This will result in the transfer of the molding composition through the injection nozzle into the shaped die cavity. The exact range of pressures will depend on the exact composition of the matrix glass, the percentage of fiber, and the temperature at which pressure is applied. For the preferred carbon fiber-borosilicate glass matrix mixture containing about 15% fiber by volume to about 30% fiber by volume with pressure being applied at about 1000° C. to about 1150° C., a pressure of about 7 MPa to about 17 MPa results in complete injection and consolidation of the composite within the shaped die cavity. Pressures below this range will generally result in clogging of the injection nozzle and incomplete die cavity filling. Pressures above this range may cause undue stress on the molding apparatus. It should be recognized that there is an interdependence between the nozzle diameter, the nozzle length and the pressure applied. If a higher pressure is used, then either a smaller nozzle diameter of a longer nozzle length or both can be successfully employed.

For the preferred composition, the mold is typically maintained at about 1100° C. to about 1250° C. until the mold is filled. For the compositions described above, this is typically about 0.25 hour to about 1.0 hour. It is allowed to cool once filled at a rate of about 15° C./minute to about 30° C./minute because a significantly higher rate of cooling could result in excessive cracking of the glass matrix. Typically, pressure on the glass matrix/fiber composition is maintained sufficient to prevent relaxation of the composite until the strain point of the glass is reached. The strain point is defined in ASTM C336 and C598. Also, the strain temperature is the lower end of the annealing range and is approximately $10^{14.5}$ poise. Preferably, pressures of about 7 MPa to about 17 MPa are maintained for typically about 2 hours, although this will depend on the specific glass composition and molding temperature used, to prevent relaxation of the composite structure which could result in porosity formation.

EXAMPLE

A length of 85.4 meters of Magnamite ™ graphite fibers type HMU (Hercules Incorporated, Wilmington, Del.) (3000 filaments per two) with a weight of 18.7 grams was impregnated with a glass-water-binder slurry by unrolling the fiber yarn from a feed spool, removing the fiber sizing by passing the yarn through the flame of a bunsen burner at moderate speed (about 6.5 meters/min.), immersing the yarn in an agitated slurry, and winding the saturated yarn on a take-up mandrel. The slurry consisted of 200 grams of Corning 7740 borosilicate glass powder —325 mesh, 25 grams of Ludox colloidal silica, and 250 ml of distilled water. Sufficient slurry impregnated the length of yarn to add 52.7 grams glass. The saturated yarn was dried to remove the water on the take-up mandrel.

After drying, the impregnated yarn was removed from the take-up mandrel and cut to an average tow length of 1.25 cm. The chopped molding composition was then placed in the reservoir chamber of a molding apparatus of design similar to that shown in FIG. 1. The injection nozzle in this example had a diameter of 0.95 cm and a length of 1.25 cm. The injection molding apparatus was then placed in a vacuum hot press and heated to 1275° C. and a load calculated to apply 14 MPa to the plunger was applied and maintained for 30 minutes. Furnace power was then shut off and the assembly cooled to 500° C. at which point pressure was removed. Assembly was then cooled to room temperature and the injection molded part was removed from the mold.

As an example of the improvement in composite performance resulting from the present invention, the load bearing capacity of sections of three composite samples was measured by compressing the sections between a flat platen and a steel chisel tip. Two of the samples were fabricated according to the present invention and had load bearing capacities of 5930 Newtons (N) and 8145N. The third sample was fabricated by unidirectional hot pressing of an identical composition and had a load bearing capacity of 1713N.

Figure 2A:
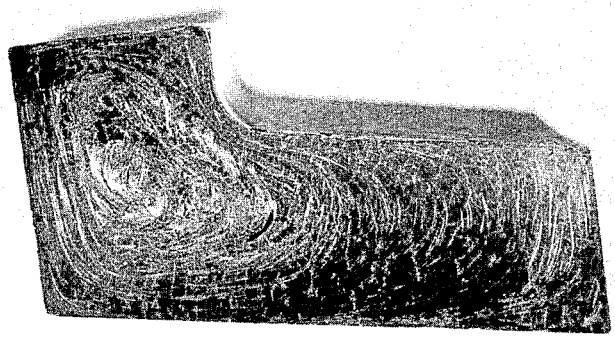
FIG. 2 shows comparative cross-sections of a composite part made with the method of this invention (FIG. 2A) and a hot pressed composite part illustrating improved fiber distribution FIG. 2B.
Figure 2B:
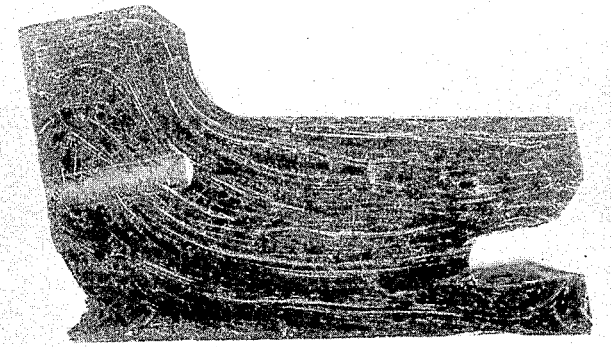
Figure 3A:
FIG. 3A shows a cross-section of a composite made with the method of this invention and FIG. 3B shows a hot pressed composite cross-section illustrating improved fiber separation.
Figure 3B:
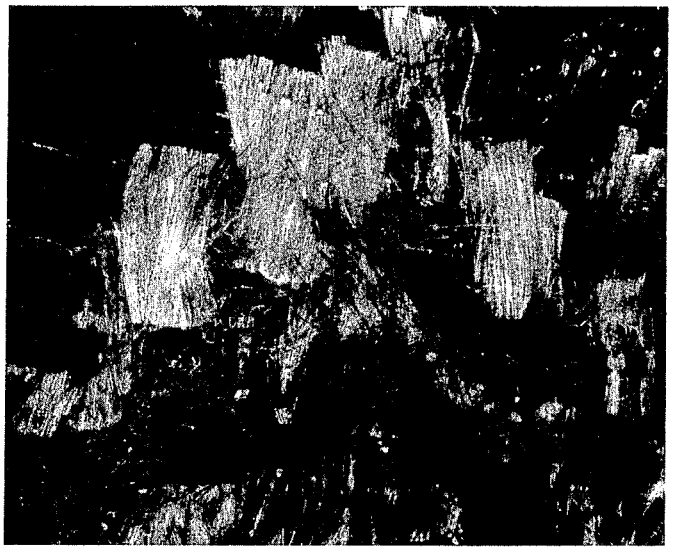

The increased strength of composites fabricated according to the present invention is the result of at least two factors. The use of an injection nozzle results in an improved fiber distribution providing more uniform reinforcement. This is illustrated in the comparison of cross-sections of composite parts described above and shown in FIG. 2. The three dimensional arrangement of fibers in A are preferred because this arrangement provides more isotropic reinforcement. In contrast, the largely planar array of fibers in B are not preferred because of the lack of reinforcement perpendicular to the array. As previously discussed, the use of an injection nozzle also results in the separation of the fiber tows into individual filaments. This is demonstrated in FIG. 3 where the microstructure of a hot pressed composite B (having non-separated fibers) is compared to a composite which was injection molded. These composites are similar in composition to those discussed above; however, in this case the two length was 0.64 cm and the injection nozzle was 0.48 cm in diameter and 2.72 cm in length.

The process of the present invention is especially well suited to the fabrication of complex shapes. It is particularly suited for those in which reinforcement is needed in more than the two dimensions typically provided in traditionally hot pressed composites. This is due to the more random distribution of the reinforcing fibers as well as the more uniform dispersion resulting from the separation of the fiber tows into individual filaments. Typical complex shapes which may be made by the process of the present invention are cylindrical shapes such as cylinder liners and gun barrels, hollow containers such as cups and spark plug and igniter insulators, and bulk or thick wall parts such as compressor shroud segments.

This process facilitates the production of net shape parts since complex multipart dies with complex geometries can be used in contrast to hot pressing processes. Not only does the present invention provide a method which is readily adaptable to making complex shapes of fiber reinforced glass matrix composites by mass production, but the resulting article has unusual strength in three dimensions by virtue of the three-dimensional random orientation of the fibers. Also, there is improved reinforcement of complex geometry parts resulting from a more random distribution of the fibers in three dimensions.

Current-art discontinuous-fiber-reinforced composites contain fiber bundles of up to 12,000 filaments. These bundles persist through the molding process and lead to a textured microstructure which contains matrix-rich regions through which a crack can easily propagate. The invention herein described causes the bundles to be broken down into the individual filaments and to be uniformly dispersed in the matrix. This results in a stronger, more uniform composite.

Finally, the process facilitates rapid part production since multiple part cavities can be fed from a single reservoir. This increased production rate reduces costs. In addition, this process enables the use of higher tow count starting yarns (which cost less than small tow yarns) and still maintain good fiber dispersion.

Thus, this invention makes a significant advance in the field of molding fiber reinforced glas matrix composites.

It should be understood that the invention is not limited to the particular embodiment shown and described herein, but that various changes and modifications may be made without departing from the spirit or scope of this concept as defined by the following claims.

We claim:

1. A method for manufacturing a discontinuous fiber reinforced glass matrix composite comprising:
   (a) impregnating continuous multifilament silicon carbide, alumina, silicon nitride or carbon fiber yarn with a slurry comprising glass, glass-ceramic powder or a mixture thereof and a carrier liquid, followed by drying to remove the carrier liquid;
   (b) chopping said impregnated multifilament yarn into discontinuous lengths;
   (c) exposing said chopped impregnated multifilament yarn to a temperature sufficient so that said matrix softens;
   (d) applying a pressure to said heated chopped impregnated multifilament yarn sufficient to displace said heated chopped impregnated multifilament yarn into a mold through an injection nozzle contoured such that sufficient die-wall shear forces are generated to separate substantially all of said multifilament yarn into individual filaments;
   (e) said injection nozzle having a diameter less than the length of said yarn and said injection nozzle having a length greater than said length of said yarn; and
   (f) maintaining a mold pressure sufficient to prevent relaxation of the composite until the strain point of the glass is reached;
resulting in a composite having greater crack resistance.

2. The method as recited in claim 1 wherein the yarn is chopped into discontinuous lengths of about 0.635 cm to about 2.54 cm.

3. The method as recited in claim 1 wherein said chopped impregnated yarn is exposed to a temperature sufficient to achieve a glass viscosity of about $10^3$ to about $10^5$ poise.

4. The method as recited in claim 1 wherein said mold pressure is about 7 MPa to about 17 MPa.

5. The method as recited in claim 1 wherein said mold is maintained at a temperature of about 900° C. to about 1500° C. until the mold is filled.

* * * * *

UNITED STATES PATENT AND TRADEMARK OFFICE
CERTIFICATE OF CORRECTION

PATENT NO.  : 4,780,432
DATED       : October 25, 1988
INVENTOR(S) : ERIC MINFORD ET AL It is certified that error appears in the above-identified patent and that said Letters Patent are hereby corrected as shown below:

Title page:

Inventor's Name - "Antonio B. Carulo" should be --Antonio B. Caruolo--

Col. 4, line 10 - "ave" should be --have--

Col. 6, line 31 - "two" should be --tow--

Col. 7, line 20 - "two" should be --tow--

Signed and Sealed this

Eighteenth Day of April, 1989

Attest:

DONALD J. QUIGG

*Attesting Officer*     Commissioner of Patents and Trademarks